United States Patent [19]
Harriman, Jr.

[11] Patent Number: 5,838,960
[45] Date of Patent: Nov. 17, 1998

[54] APPARATUS FOR PERFORMING AN ATOMIC ADD INSTRUCTIONS

[75] Inventor: Edward S. Harriman, Jr., Bedford, Mass.

[73] Assignee: Bay Networks, Inc., Santa Clara, Calif.

[21] Appl. No.: 721,267

[22] Filed: Sep. 26, 1996

[51] Int. Cl.⁶ .................................................. G06F 9/38
[52] U.S. Cl. .......................................... 395/562; 711/155
[58] Field of Search ................................ 711/155, 100, 711/147, 152; 395/561, 562, 564, 394

[56] References Cited

U.S. PATENT DOCUMENTS

| | | | |
|---|---|---|---|
| 5,051,940 | 9/1991 | Vassiliadis et al. | 364/736.04 |
| 5,291,581 | 3/1994 | Cutler et al. | 711/152 |
| 5,359,718 | 10/1994 | Phillips et al. | 395/562 |
| 5,426,743 | 6/1995 | Phillips et al. | 395/562 |
| 5,485,594 | 1/1996 | Foster | 711/100 |
| 5,542,084 | 7/1996 | Lowe, Jr. | 711/155 |
| 5,634,034 | 5/1997 | Foster | 711/147 |
| 5,675,777 | 10/1997 | Glickeman | 395/561 |

OTHER PUBLICATIONS

Mick et al., Bit–Slice Micrprocessor Design, McGraw Hill Book Company, A Four–Bit Carry Lookahead Adder, pp. 94–99, Feb. 1992.

Vassiliadis et al., Interlock Collapsing ALU's, IEEE/IEE Publications OnDisc, pp. 825–839, Jul. 1993.

*Primary Examiner*—Richard L. Ellis
*Assistant Examiner*—Patrice L. Winder
*Attorney, Agent, or Firm*—Blakely, Sokoloff, Taylor & Zafman

[57] ABSTRACT

A pipeline processor having an add circuit configured to execute separate atomic add instructions in consecutive clock cycles, wherein each separate atomic add instructions can be updating the same memory address location. In one embodiment, the add circuit includes a carry-save-add circuit coupled to a set of carry propagate adder circuits. The carry-save-add circuit is configured to perform an add operation in one processor clock cycle and the set of carry propagate adder circuits are configured to propagate, in subsequent clock cycles, a carry generated by the carry-save-add circuit. The add circuit is further configured to feedforward partially propagated sums to the carry-save-add circuit as at least one operand for subsequent atomic add instructions. In one embodiment, the pipeline processor is implemented on a multitasking computer system architecture supporting multiple independent processors dedicated to processing data packets.

13 Claims, 3 Drawing Sheets

Processor 100

APPARATUS FOR PERFORMING AN ATOMIC ADD INSTRUCTIONS

FIELD OF THE INVENTION

The present invention relates generally to the field of computer systems, and, in particular, to the performing of atomic add instructions.

BACKGROUND OF THE INVENTION

Information communicated along a network is commonly referred to as a data packet. A data packet is described as a well-defined block of bytes, typically consisting of a header, data, and trailer. The header of a data packet usually includes the source and destination addresses.

In the large scale networks, switching hubs are provided to "switch" data packets from one network segment to another network segment. These network segments may be separated by several intervening networks and, possibly, by many miles. Typically, switching hubs receive data packets on a port coupled to a network segment, internally processes the data packet, and the transmit the data packets out a port coupled to a different network segment.

In some cases, more advanced switching hubs are able to increase the speed and efficiency of transferring data packets by performing packet switching techniques which involve relaying the packets through different switching hubs along the best routes presently available between the source and the destination. Determining the route upon which the packets are sent can be based upon such factors as the traffic of the available routes and which routes are presently operative.

Typically, the switching hubs operate at the network layer of the seven layer Open Systems Interconnection (OSI) Reference Model developed by the International Standardization Organization (ISO). Moreover, considering that switching hubs are independent of the data-link layer protocols, switching hubs can typically connect networks using different architecture (for example, Ethernet to Token Ring or Ethernet to FDDI).

However, as the bandwidth of network transmission mediums continuously increases, the speed and efficiency of the switching hubs should be increased to avoid slowing down the transmission of the data along the networks. One solution to increasing the speed and efficiency of a switching hub is to use atomic add instructions.

Atomic add instructions allow a process to add a value directly to a value stored at a memory address location. That is, the atomic add instructions read a memory location, perform the add, and write the sum back to memory. The use of atomic add instructions therefore lend themselves to the maintenance of statistics needed for network monitoring and billing purposes.

In order to maintain maximum performance of accessing memory, the memory access operations of an atomic add instruction should be included as pipeline stages of the processor performing an atomic add instruction. However, considering conventional full carry add operations usually can not be completed in single stage of a pipeline, atomic add instructions can not be executed in parallel in a pipeline processor.

That is, considering the possibility that two adjacently scheduled atomic add instructions could be updating a value at the same memory address location, the second atomic add instruction could not begin its add operation until the first atomic add instruction has generated a final result, which will take more than one clock cycle. Otherwise, the second atomic add instruction may be updating stale data.

Therefore, it can be appreciated, that there is a need for a processor is able execute atomic add instructions in parallel using a pipelined processor.

SUMMARY OF THE INVENTION

The present invention provides a pipeline processor having an add circuit configured to execute separate atomic add instructions in consecutive clock cycles, wherein each separate atomic add instructions can be updating the same memory address location. In one embodiment, the add circuit includes a carry-save-add circuit coupled to a set of carry propagate adder circuits. The carry-save-add circuit is configured to perform an add operation in one processor clock cycle and the set of carry propagate adder circuits are configured to propagate, in subsequent clock cycles, a carry generated by the carry-save-add circuit. The add circuit is further configured to feed forward partially propagated sums to the carry-save-add circuit as at least one operand for subsequent atomic add instructions. In one embodiment, the pipeline processor is implemented on a multitasking computer system architecture supporting multiple independent processors dedicated to processing data packets.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An apparatus is described for executing atomic add instructions in parallel in a pipeline processor, wherein separate atomic add instructions updating the same memory address location can be executed in consecutive clock cycles. In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Figure 1:
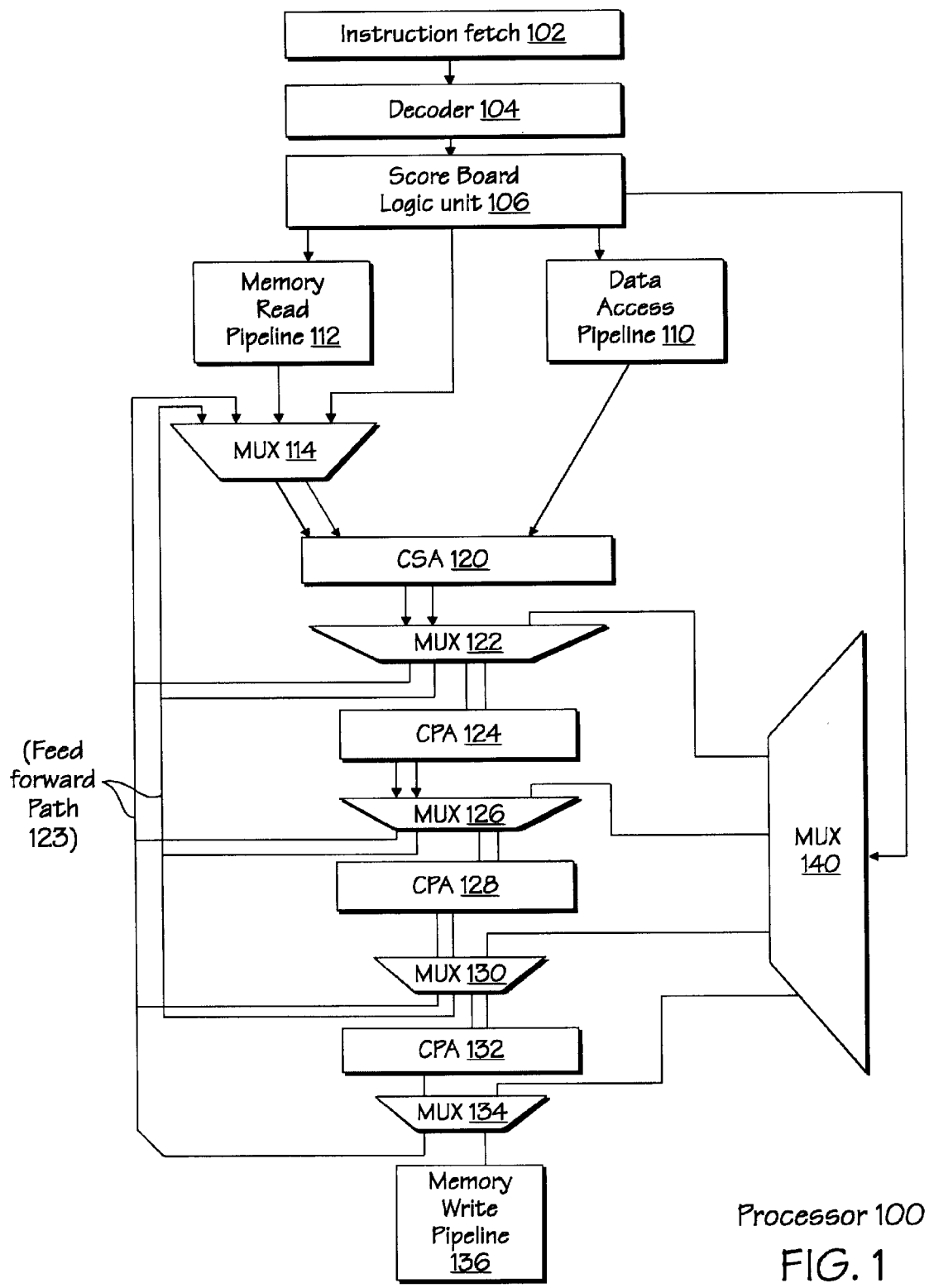
FIG. 1 illustrates an exemplary pipelined processor configured to executed atomic add instructions according to one embodiment of the present invention.

FIG. 1 illustrates a pipeline processor 100 configured to execute multiple atomic add instructions in parallel according to one embodiment of the present invention. The pipeline processor 100 can be implemented as a section of a larger general purpose processor, or alternatively implemented as an individual processor dedicated to executing atomic instructions. Atomic instructions, as described in the background section, directly update a memory address locations. That is, the instructions read a memory location, update a value at the memory location, and write the updated value at the memory location.

The processor of FIG. 1 includes an instruction prefetch unit 102 for fetching instructions to be executed, and a decoder unit 104 for decoding a instruction that has been fetched. The decoder unit decodes the instruction into an opcode, which indicates the operation of the instruction, and a pair of operands which identify a register, cache, or memory location storing data to be operated on by the opcode.

Coupled to the decoder unit 104 is a scoreboard logic unit 106. In one embodiment, the scoreboard logic unit reads the operands of the current atomic instruction to determine whether the current atomic add instruction is updating a memory address location that is also being updated by a previously dispatched atomic add instruction. In that case, the scoreboard logic will have the intermediate results of the previously dispatched atomic add instruction bypassed onto a feedforward path and provided as an operand to be updated by the current atomic add instruction. The operations of the scoreboard logic are discussed in greater detail below.

The processor of FIG. 1 further includes a memory access pipeline section 112 and a data access pipeline section 110. The data access pipeline section 110 typically accesses a data value that is to be added to a value at a specific memory location. The data value is usually accessed from a general purpose register and may be initially provided as an immediate value provided in the respective atomic add instruction.

The memory access pipeline section 112 of the pipeline processor 100 is responsible for generating an address for a memory location storing a data value that is to be updated by the current atomic add instruction. The memory location may be external to the processor 100 or located on the same die area. In one embodiment, the memory address location may be generated by adding an immediate value provided by the respective atomic add instruction to an offset value provided in a registers. Consider the example atomic add instruction shown below in Table 1.

TABLE 1 atadd d0, d1[0]

In the example of Table 1, the data stored in the register d0 is to be added to the data stored in the memory location identified by value of register d1[0]. That is, the address of the memory location to be updated is generated by adding 0 to the address in d1[31:0].

Once the memory address has been generated, the address is sent to a memory controller of the respective memory device. After the memory controller locates and accesses the data value at the specified address location, the data value is returned to the processor 100 to be updated. It will be apparent to those skilled in the art, that other circuit configurations could be implemented to access memory address and data locations without departing from the scope of the invention.

The data values provided by the memory access section 112 and the data access section 110 of the pipeline 100 are then provided as operands to an add unit of the processor 100. In one embodiment, memory access section 112 connects to the add unit via a mux 114.

In one embodiment, the mux 114 accepts four inputs and provides two outputs to the add unit. Two inputs of mux 114 include lines from a feed forward path 123 which are configured to provide a partially propagated sum generated by a previously dispatched atomic add instruction. A third input line provides a data value that is to be updated, as provided by the memory access pipeline unit 112. A fourth input line provides a select value from the scoreboard logic unit that indicates whether the data provided in the first two lines or the third line will be forwarded to the add unit.

In one embodiment, the add unit consist of a carry-save-adder (CSA). Use of the CSA 120 allows the add operation of the atomic add instruction to progress in one clock cycle, deferring the carry propagation of the add operation to subsequent pipeline stages. The carry-save-adder consist of a set of 3 input/2 output independent full adders. Typically, the number of independent full adders provided in the CSA 120 is equal to the number of bit positions provided in the data path of the processor 100. Each independent full adder adds together at least one bit provided from each of the two operands. The CSA 120 separately saves the carry bit and the sum bit generated for each adder. As a result, in one clock cycle/pipeline stage the CSA 120 generates a set of sum bits and a corresponding set of carry bits.

Coupled to the CSA 120 is a set of carry propagation adders (CPA) (124, 128, 132) which propagate the set of carry bits generated by the CSA in order to generate a final sum. The number of CPA's and pipeline stages needed to propagate the carry bits can vary within the scope of the invention.

An example of the propagation technique is shown in Table 2 below. In this example, the carry bits are propagated 4 bit positions in each pipeline stage. The number of bit positions that the carry bits can be propagated can vary within the scope of the invention. Moreover, in the following example, the letter 'o' (lower case O) is used to indicate a logical bit which is known to be zero regardless of the input data.

TABLE 2

| A: | 1111 1111 1111 1111 | |
|---|---|---|
| B: | 0000 0000 0000 0000+ | |
| CS Cry: 0 | 0000 0000 0000 001 | |
| CS Sum: | 1111 1111 1111 1110 >> | output of CSA |
| CSCry: 0 | ooo0 ooo0 ooo1 oooo | |
| CS Sum: | 1111 1111 1111 0000 >> | output of first CPA |
| CS Cry: 0 | ooo0 ooo1 oooo oooo | |
| CS Sum: | 1111 1111 0000 0000 >> | output of second CPA |
| CS Cry: 0 | ooo1 oooo oooo oooo | |
| CS Sum: | 1111 0000 0000 0000 >> | output of third CPA |
| CS Cry: 1 | oooo oooo oooo oooo | |
| CS Sum: | 0000 0000 0000 0000 >> | output of fourth CPA |

Note that in the above example, the amount of feed forward information dwindles as the carry is propagated. During the first feed forward stage, a complete set of CS Sums and CS carries are to be fed forward. However, in the second stage, only a complete set of CS Sums and four carries are to be fed forward as all other carry bits are known to be zero. In subsequent stages one fewer carries are fed forward until all caries are propagated at stage four.

Coupled to the output of the CSA and each CPA following the CSA is a separate mux (122, 126, 130, 134). The muxes 122, 126, and 130 are configured to accept an enable line, and a set of carry bits and a set of sum bits generated by the preceding adder. Mux 134 coupled to the last CPA 132 only needs to accept an enable line and a set of final sum bits fully propagated by CPA 132.

Muxes 122, 126, and 130 are further configured to provide four output lines, two of which bypass the carry and sum bits along a feed forward path 123 to CSA 120 via mux 114, and two which forward the carry and sum bits to the next CPA. Mux 134 coupled to the last CPA 132 is configured to provide two output lines, one which bypasses a final sum along a feed forward path to CSA 120 via mux 114, and a second which provides the final sum to a memory write pipeline unit 136 to have the final sum written in memory.

As a result, if the enable is activated for a particular mux, the respective mux will bypass a partially propagated sum along the feed forward path 123 to the CSA 120 via mux 114, and provided as an operand for the add operation of a separate atomic add instruction. The partially propagated sum consists of a set of carry bits and a corresponding set of sum bits, as generated by the preceding adder. In the case of the mux 134 coupled to the last CPA, only the final sum needs to be bypassed to the CSA 120.

As a result of feed forwarding partially propagated sum, an atomic add instruction can update a memory address location that is also being updated by previously dispatched atomic add instruction that has yet to write the updated result. That is, a partially propagated sum can be bypassed to the CSA as an operand for a separate subsequent atomic add instruction rather than waiting for the fully propagated sum of the first atomic add instruction to be written to memory. As a result, the processor 100 is able to scale down the add operation of each atomic add instruction to a single pipe stage/clock cycle.

The CSA 120 is able to use the partially propagated sum as operands because the CSA consist of full adders. That is, each independent adder of the CSA 120 accepts three inputs.

As mentioned above, in one embodiment the processor 100 uses the scoreboard logic unit 106 to determine when and if a partially propagated sum should be fed forward back to the CSA to be updated by a separate atomic add instruction. For example, in one embodiment the scoreboard logic unit 106 can maintain a table indexed by memory address locations. For each entry, the logic unit 106 will record the clock cycle that an atomic add instruction had been issued to update a data value at the respective memory address location. By knowing the number of pipeline stages in processor 100 and the number of clock cycles that have passed since the prior atomic add instruction had been dispatched, the scoreboard logic unit can accurately predict where and when the partially propagated sum should be feed forwarded back to the CSA. In the case of the present invention implemented in an alternative processor configuration, the score board logic could further include for each entry the opcode for each instruction issued to further assist in determining the number of clock cycles that have passed since the respective instruction has been issued.

Therefore, prior to issuing an atomic add instruction, the logic unit 106 could compare the memory address location that is to be updated with the index of memory locations that are presently being updated another atomic add instruction. When a match is found, based on the number of clock cycles that have passed since the prior atomic add instruction has been dispatched (which is updating the same memory location), the scoreboard logic will send a selection signal to mux 140, and an enablement signal to mux 114.

Based on the selection signal sent from the scoreboard logic unit 106 to the mux 140, the mux 140 will in turn send an enablement signal to the appropriate mux (122, 126, 130, 134) in order to bypass a partially propagated sum to the CSA. Furthermore, the enablement signal sent to the mux 114 will allow the mux 114 to bypass the partially propagated sum to the CSA in place of the stale data retrieved from memory.

The table used by the scoreboard logic can be configured to hold a total number of entries corresponding to the number of pipeline stages provided in the processor 100 to propagate a carry generated by the CSA 120. Once a fully propagated sum has been written to memory, the corresponding entry in the table can be replaced with an entry for a new atomic instruction.

It will be apparent to those skilled in the art, that a device other than a scoreboard logic unit can be used to determine when and where a partially propagated sum should be fed forward to the CSA 120 as an operand for a separate atomic add instruction, without departing from the scope of the invention.

Multitasking Multiprocessor

One embodiment of the invention is implemented on a multitasking computer system architecture supporting multiple independent, specialized, loosely coupled processors. The architecture provides a novel approach to scheduling processes for execution on one of the multiple processors, migrating processes between the processors, rescheduling of processes upon a cache miss, distributing memory along pipeline stages in the processors, wherein each process may represent the present state of a data packet being processed by a data packed processing application. The architecture is particularly optimized for operations related to as may be performed by an International Standards Organization (ISO) Open Systems Interconnection (OSI) layer two (i.e., media access control sublayer—MAC) based network switching device, i.e., a switching hub, in a data communications network.

Figure 2:
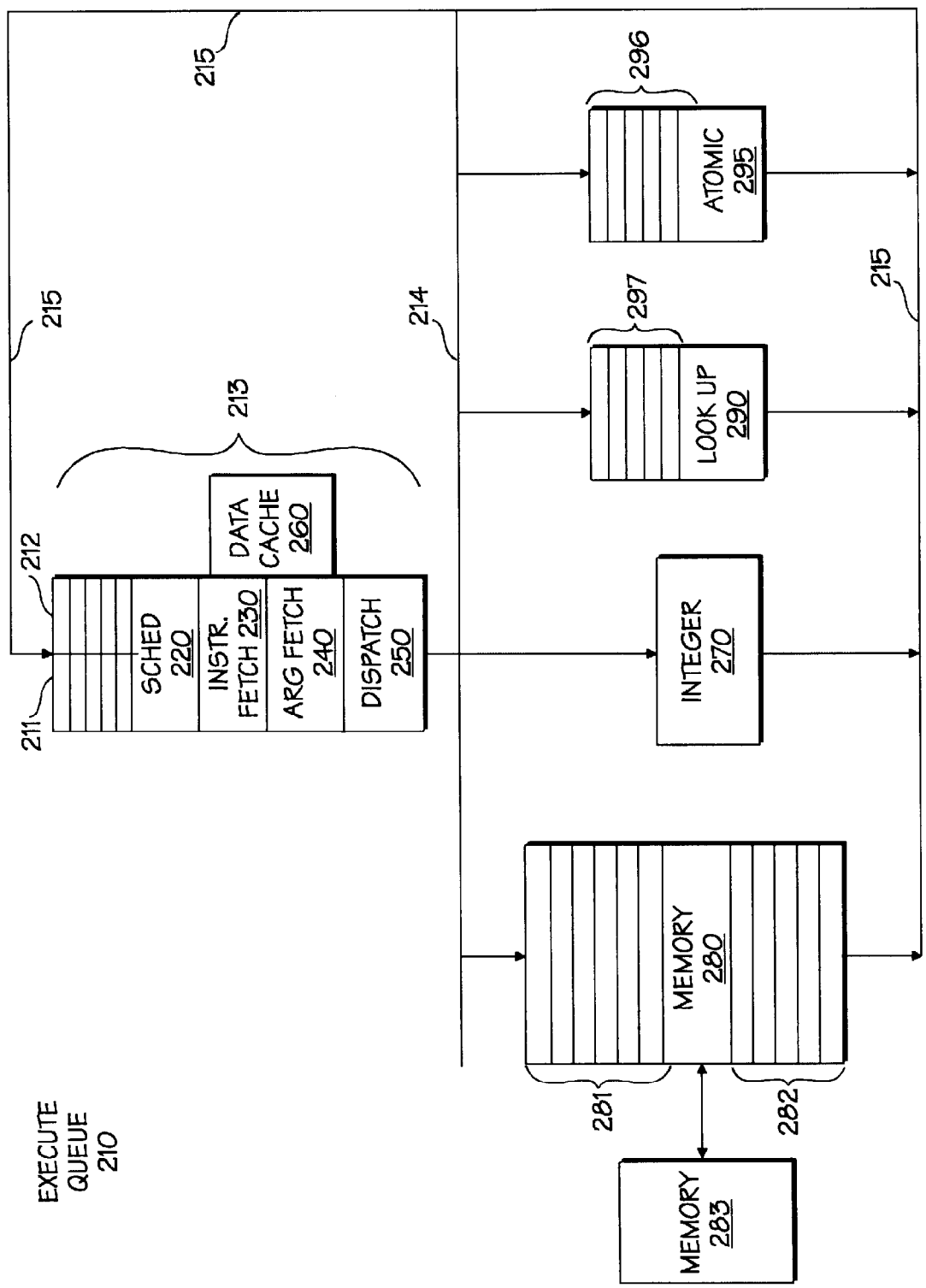
FIG. 2 illustrates a multitasking multiprocessor capable of implementing the present invention according to one embodiment.

Referring to FIG. 2, the multitasking multiprocessor implementing one embodiment of the present invention is shown. In particular, the processor consist of a plurality of specialized processors, e.g., processors 270, 280, 290 and 295, which multitask between a plurality of concurrently executing processes. Each processor performs a specific and relatively narrow set of operations such as arithmetic operations or memory access operations.

The state of each process is specified by a set of registers, referred to as the process' context. In one embodiment, each process context has between 16 and 32 general registers, 4 pointer (address) registers, a program counter (PC), and a condition flag. Importantly, as each process executes independently of all other processes, the state of each process is independent of the state of all other processes.

Figure 3:
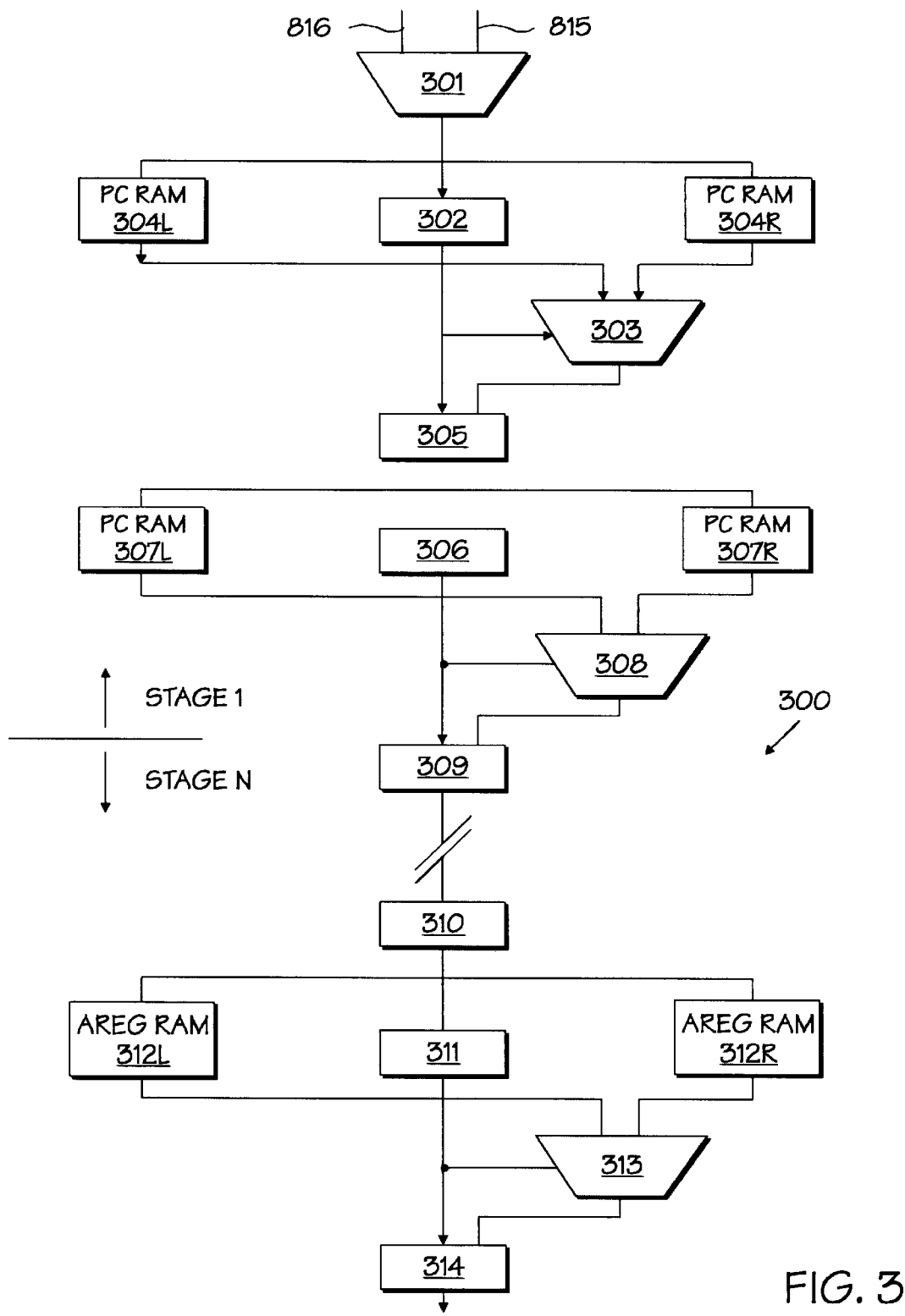
FIG. 3 illustrates an execution pipeline of a processor included in a multitasking multiprocessor according to one embodiment of the present invention.

With reference to FIG. 3, the processors typically include an execution pipelines made up of a plurality of stages. FIG. 3 illustrates an execution pipeline 300, or simply, pipeline 300, for a processor. The pipeline comprises, for example, a series of registers 302, 305, 306, 309, 310, 311, 314, etc., coupled in communication. In one embodiment of the present invention, the registers are D flip-flops.

A series of one or more registers within the pipeline represent a stage. For example, registers 302, 305, 306 and 309 comprise stage 1, while registers 310, 311 and 314 comprise stage n.

Each stage of the pipeline for a given processor is executing a different, independent process. This configuration allows each processor a set of processes to execute. Of course, the set processes operated on by a processor changes dynamically. Moreover, more processes than pipeline stages exist at any given time, as described below, which allows processes to migrate between processors and allows the processes queued at any one processor to increase momentarily without causing other processors to sit idle. For example, when many processes are queued at input queue 281 for execution by the memory processor 280, other processes continue to be executed by the other processors 270, 290, and 295.

It is important to note that although one embodiment of the present invention provides for four processors executing concurrently as shown in FIG. 2, it will be understood that the architecture embodied by the present invention is scalable. In other words, any number of conceivable processors may be coupled as illustrated in FIG. 2.

The multitasking system embodied by the present invention further includes a scheduler 220. The scheduler 220 maintains a list of processes that are ready to be executed. This list is maintained in a first in first out (FIFO) order in an execute queue 210. Every clock cycle, the scheduler dequeues a process from the execute queue 210 and passes the process identification (PID) to an instruction fetch unit 230. The instruction fetch unit 230 receives the PID and uses it to read the program counter (PC) for the associated process. The fetch unit then reads a single instruction from a program store and transfers the instruction to an argument fetch unit 240. The argument fetch unit 240 decodes the instruction and reads the arguments specified in the instruction. The arguments may refer to general registers associated with the process or memory locations. The argument fetch unit communicates with the data cache 260 to determine which memory locations are immediately available via cache. The argument fetch unit 240 then transfers the arguments fetched and the associated instruction to the dispatcher 250.

The dispatch unit examines the instruction and the state of cache 260 to determine to which processor the instruction should be transferred for execution. If cache 260 indicates that an argument is needed from memory 283 but the argument is not present in cache, the instruction fails, i.e., the instruction is not executed by a processor. Rather, the instruction is forwarded to a memory processor 280. The memory processor 280 reads the appropriate cache line containing the needed argument from memory 283. Upon completion of performing the read of the cache line, memory processor 280 requeues the process so that the instruction can be processed again by the scheduler 220, instruction fetch unit 230, argument fetch unit 240 and dispatcher 250, collectively referred to hereafter as prefetch unit 213. If after processing the instruction a second time, the prefetch unit 213 determines all the arguments are present in data cache 260, the instruction is sent to the appropriate processor for execution via internal bus 214.

If the instruction specifies the operation to be executed is an arithmetic operation such as add, the process identification (PID), the instruction, and the arguments associated with the instruction are transferred to the integer processor 270. If the operation to be executed is a memory access operation, e.g., a load or store, then the instruction is forwarded to the memory processor 280. Likewise, if the operation is an atomic operation, then the instruction is delivered to the atomic processor 295. In one embodiment of the present invention, the atomic add instruction is executed by the atomic processor 295.

Upon an instruction be dispatched to an appropriate processor, that processor is responsible for completing the operation indicated by the instruction, updating the state (i.e., the registers) of the process, and requeuing the process back to the execute queue 210 maintained by the scheduler 220.

As discussed above, the present invention is envisioned as operating in a switching hub in a data communications network. In that environment, latency is not a key issue; rather, data packet throughput is of primary importance. Due to the fact that there are many processes available for execution, combined with the fact that latency is not of primary consideration, it is not as important that any one instruction in a process be executed quickly. As a result, the present invention may utilize a greater number of pipeline stages. For example, the scheduler, instruction fetch, argument fetch, dispatcher, integer processor path has eighteen pipeline stages.

In general, although embodiment supports a long execution pipeline for each processor, each stage in the pipeline is operating on behalf of a unique and independent process. Thus, there is no need for bypassing whereby results from a stage in the pipeline are fed back to a preceding stage in the pipeline. Likewise, feedforward, where a stage in the pipeline is fed an argument before the associated instruction is received by the stage in the pipeline, is not necessary. This greatly simplifies the logic at each pipeline stage.

Processes vs. Pipeline Stages

One embodiment of the present invention supports more processes than pipeline stages, as provided and limited by the depth of the execute queue 210. By supporting more processes than the cumulative sum of pipeline stages in each of the processors, the processors continually have processes waiting in their input queue to be executed. By overloading the processors with processes at any given instant, the processors generally always have processes queued for execution and never sit idle, thus improving system performance. The greater the depth of the execute queue, the greater the number of processes supported by the architecture, and the greater number of processes queued by each of the individual processors for execution. This ensures that each stage in a pipeline of a processor is executing at all times.

For example, the lookup processor 290 executes the lookup instruction. The execution of the lookup instruction generally requires a number of cycles through the execution pipeline of the lookup processor to complete execution of the instruction. Thus, when the dispatcher 250 hands a process to the lookup processor, the lookup processor is busy for a period of time thereafter, executing the lookup instruction. By providing an input queue 297 to the lookup processor, dispatcher can dispatch a process to the lookup processor for execution of the lookup instruction. The process remains in the lookup processor's input queue 297 until the first stage in the execution pipeline accepts the process from the input queue.

Migration of Processes Between Processors

Closely related to the ability to support at least as many processes as there are the sum of pipeline stages in the processors, is the ability to migrate processes between processors. With reference to FIG. 2, a feedback path is provided by bus 215. When a processor completes execution of an instruction, the program counter for the process is incremented to point to the next instruction of the process. The process is then requeued by scheduler 220 in execute queue 210. Prefetch unit 213 fetches the next instruction and associated arguments, if any, and dispatches the process to the same or other processor for execution of the next instruction (or same instruction, in the case of a cache miss) in the process. Thus, a process can migrate from one processor to another processor.

In alternative embodiments, the present invention may be implemented in chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A pipelined processor comprising:

a decoder; and an add circuit coupled to the decoder, the add circuit configured to execute a first atomic add instruction and a second atomic add instruction in consecutive clock cycles, wherein said first atomic add instruction and said second atomic add instruction both update a first memory address location.

2. The pipelined processor of claim 1 wherein the add circuit comprises a carry-save-add circuit configured to execute in a first clock cycle, and a set of carry propagate adder circuits coupled to the carry-save-add circuit, the set of carry propagate adder circuits configured to propagate, in subsequent clock cycles, a carry generated by the carry-save-add circuit; and said add circuit is further configured to feedforward a partially propagated sum to the carry-save-add circuit as at least one operand for a separate atomic add instruction.

3. The pipelined processor of claim 2 wherein the add circuit is further configured to feed forward from each stage of propagation following the carry-save-add circuit.

4. The pipelined processor of claim 3, wherein the atomic add instructions perform an addition operation on a value stored in an addressable memory location, wherein said atomic add instructions reading the addressable memory location, performing an add operation of the value stored at the addressable memory location, and writing a sum to the addressable memory location.

5. The pipelined processor of claim 4 implemented on a multitasking computer system architecture supporting multiple independent processors dedicated to processing data packets.

6. The pipelined processor of claim 4 implemented in a switching system product.

7. The pipelined processor of claim 4 implemented in a transmission system product.

8. A pipelined processor comprising:

a decoder; and an add circuit coupled to the decoder, the add circuit having a carry-save-add circuit configured to perform an atomic add operation of a first atomic add instruction in a first pipeline stage, a plurality of propagation circuits configured to propagate, in subsequent pipeline stages, a carry generated by the add operation of the carry-save-adder circuit, and a feed forward path coupled to each propagation circuit, said feed forward path configured to provide a partially propagated sum to the carry-save-add circuit as at least one operand for a second atomic add instruction updating a memory address updated by said first atomic add instruction.

9. The pipelined processor of claim 8, wherein the processor is configured to execute separate atomic add instructions on a first memory address location in consecutive clock cycles.

10. The pipelined processor of claim 9, wherein an atomic add instruction performs an add operation on a value stored in an addressable memory location, said atomic add instruction reading the addressable memory location, performing an add operation of the value stored at the addressable memory location, and writing a sum to the addressable memory location.

11. The pipelined processor of claim 10 implemented on a multitasking computer system architecture supporting multiple independent processors dedicated to processing data packets.

12. The pipelined processor of claim 10 implemented in a switching system product.

13. The pipelined processor of claim 10 implemented in a transmission system product.

* * * * *